US012664758B2

(12) United States Patent
Shukla et al.

(10) Patent No.: US 12,664,758 B2
(45) Date of Patent: Jun. 23, 2026

(54) DETECTING DEVICE COMPONENT DEFECTS AND GENERATING CORRESPONDING RECOMMENDATIONS USING ARTIFICIAL INTELLIGENCE TECHNIQUES

(71) Applicant: Dell Products L.P., Round Rock, TX (US)

(72) Inventors: Ravi Shukla, Bengaluru (IN); Jeffrey Scott Vah, Round Rock, TX (US); Wilson Tetsuia Kitsunai, Sorocaba (BR); Aaron Sanchez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 18/422,797

(22) Filed: Jan. 25, 2024

(65) Prior Publication Data

US 2025/0245813 A1     Jul. 31, 2025

(51) Int. Cl.
*G06T 7/00*          (2017.01)
*G06F 16/90*         (2019.01)
(Continued)

(52) U.S. Cl.
CPC .......... *G06T 7/0008* (2013.01); *G06T 7/0004* (2013.01); *G06T 11/60* (2013.01);
(Continued)

(58) Field of Classification Search
CPC ................... G06T 7/0008; G06T 11/60; G06T 2207/30121; G06T 2207/20081;
(Continued)

(56) References Cited

U.S. PATENT DOCUMENTS 10,991,088 B2      4/2021  Ambikapathi et al.
2020/0005449 A1 *  1/2020  Ambikapathi ....... G06V 10/764

FOREIGN PATENT DOCUMENTS

CN     109118482  A  *  1/2019  ............... G06T 7/11
CN     109118482  B     1/2019
CN     113643224  A  * 11/2021  ....... G06F 18/24323

OTHER PUBLICATIONS

Bard, A Conversational AI Tool by Google, https://bard.google.com/, accessed Jan. 25, 2024.
(Continued)

*Primary Examiner* — Emily C Terrell
*Assistant Examiner* — Daniella M. DiGuglielmo
(74) *Attorney, Agent, or Firm* — Ryan, Mason & Lewis, LLP

(57)          ABSTRACT
Methods, apparatus, and processor-readable storage media for detecting device component defects and generating corresponding recommendations using artificial intelligence techniques are provided herein. An example computer-implemented method includes obtaining image data of one or more device components and user input pertaining to at least a portion of the device component(s); predicting at least one defect associated with the device component(s) by processing at least a portion of the image data and the user input using a first set of artificial intelligence techniques; determining, using a second set of artificial intelligence techniques, that the at least one predicted defect is repairable; generating recommendation(s) for repairing the defect(s) by processing, using the second set artificial intelligence techniques, the at least a portion of the image data, the at least a portion of the user input, and information pertaining to the defect(s); and performing automated actions based on the recommendation(s).

20 Claims, 8 Drawing Sheets

(51) Int. Cl.
| | |
|---|---|
| *G06T 11/60* | (2026.01) |
| *G06V 10/25* | (2022.01) |
| *G06V 10/764* | (2022.01) |
| *G09G 3/00* | (2006.01) |

(52) U.S. Cl.
CPC ............ *G06V 10/25* (2022.01); *G06V 10/764* (2022.01); *G09G 3/006* (2013.01); *G06F 16/90* (2019.01); *G06T 2207/20081* (2013.01); *G06T 2207/20084* (2013.01); *G06T 2207/30121* (2013.01)

(58) Field of Classification Search
CPC ........ G06T 2207/20084; G06T 7/0004; G06V 10/25; G06V 10/764; G09G 3/006; G06F 16/90
See application file for complete search history.

(56) References Cited

OTHER PUBLICATIONS

Open AI, Research GPT-4, Mar. 14, 2023, https://openai.com/research/gpt-4.

* cited by examiner

Figure 7:
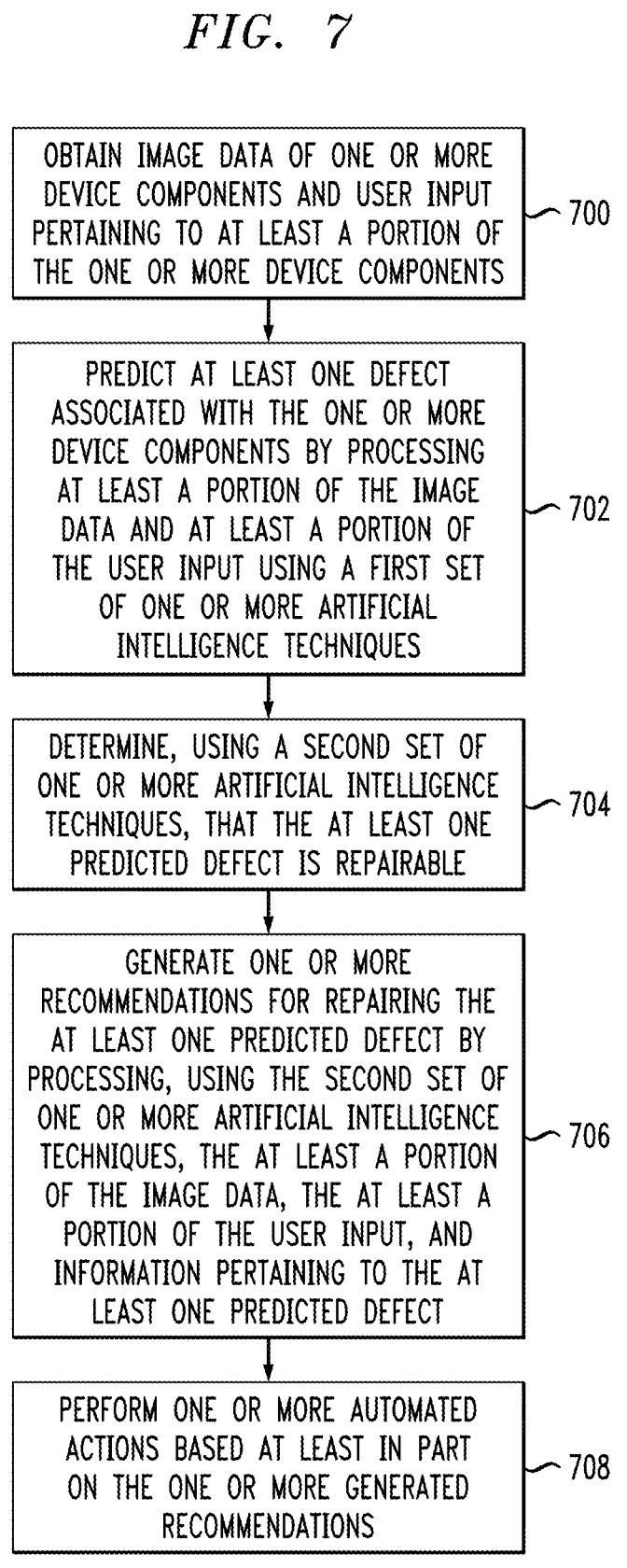

OBTAIN IMAGE DATA OF ONE OR MORE
DEVICE COMPONENTS AND USER INPUT
PERTAINING TO AT LEAST A PORTION OF
THE ONE OR MORE DEVICE COMPONENTS ⟞ 700

↓

PREDICT AT LEAST ONE DEFECT
ASSOCIATED WITH THE ONE OR MORE
DEVICE COMPONENTS BY PROCESSING
AT LEAST A PORTION OF THE IMAGE
DATA AND AT LEAST A PORTION OF
THE USER INPUT USING A FIRST SET
OF ONE OR MORE ARTIFICIAL
INTELLIGENCE TECHNIQUES ⟞ 702

↓

DETERMINE, USING A SECOND SET OF
ONE OR MORE ARTIFICIAL INTELLIGENCE
TECHNIQUES, THAT THE AT LEAST ONE
PREDICTED DEFECT IS REPAIRABLE ⟞ 704

↓

GENERATE ONE OR MORE
RECOMMENDATIONS FOR REPAIRING THE
AT LEAST ONE PREDICTED DEFECT BY
PROCESSING, USING THE SECOND SET OF
ONE OR MORE ARTIFICIAL INTELLIGENCE
TECHNIQUES, THE AT LEAST A PORTION
OF THE IMAGE DATA, THE AT LEAST A
PORTION OF THE USER INPUT, AND
INFORMATION PERTAINING TO THE AT
LEAST ONE PREDICTED DEFECT ⟞ 706

↓

PERFORM ONE OR MORE AUTOMATED
ACTIONS BASED AT LEAST IN PART
ON THE ONE OR MORE GENERATED
RECOMMENDATIONS ⟞ 708

| APPS | | APPS | | | APPS |

| VM AND/OR CONTAINER SET 1 | | VM AND/OR CONTAINER SET 2 | 802-2 · · · | VM AND/OR CONTAINER SET L |

802-1                                                              802-L

| VIRTUALIZATION INFRASTRUCTURE | 804 |

| PHYSICAL INFRASTRUCTURE | 805 |

PROCESSING DEVICE

900

904          902-2

914          PROCESSING DEVICE

NETWORK INTERFACE          902-3

910          PROCESSING DEVICE

PROCESSOR          NETWORK 912          902-K

MEMORY          PROCESSING DEVICE

DETECTING DEVICE COMPONENT DEFECTS AND GENERATING CORRESPONDING RECOMMENDATIONS USING ARTIFICIAL INTELLIGENCE TECHNIQUES

BACKGROUND

Under conventional approaches, defective device components (e.g., display parts) are typically manually inspected by technicians. However, such approaches are error-prone, contributing towards missed device component failures, device components being mistakenly classified as unrepairable, etc., which can increase resource wastage in various forms, such as, e.g., scrap rate, and repair yield.

SUMMARY

Illustrative embodiments of the disclosure provide techniques for detecting device component defects and generating corresponding recommendations using artificial intelligence techniques.

An exemplary computer-implemented method includes obtaining image data of one or more device components and user input pertaining to at least a portion of the one or more device components, and predicting at least one defect associated with the one or more device components by processing at least a portion of the image data and at least a portion of the user input using a first set of one or more artificial intelligence techniques. Additionally, the method includes determining, using a second set of one or more artificial intelligence techniques, that the at least one predicted defect is repairable, and generating one or more recommendations for repairing the at least one predicted defect by processing, using the second set of one or more artificial intelligence techniques, the at least a portion of the image data, the at least a portion of the user input, and information pertaining to the at least one predicted defect. Further, the method also includes performing one or more automated actions based at least in part on the one or more generated recommendations.

Illustrative embodiments can provide significant advantages relative to conventional approaches. For example, problems associated with resource wastage arising from error-prone approaches are overcome in one or more embodiments through automatically predicting device component defects using a first set of artificial intelligence techniques and automatically generating corresponding repair-related recommendations using a second set of artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example workflow with respect to a display panel in an illustrative embodiment.

FIG. 7 is a flow diagram of a process for detecting device component defects and generating corresponding recommendations using artificial intelligence techniques in an illustrative embodiment.

FIGS. 8 and 9 show examples of processing platforms that may be utilized to implement at least a portion of an information processing system in illustrative embodiments.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
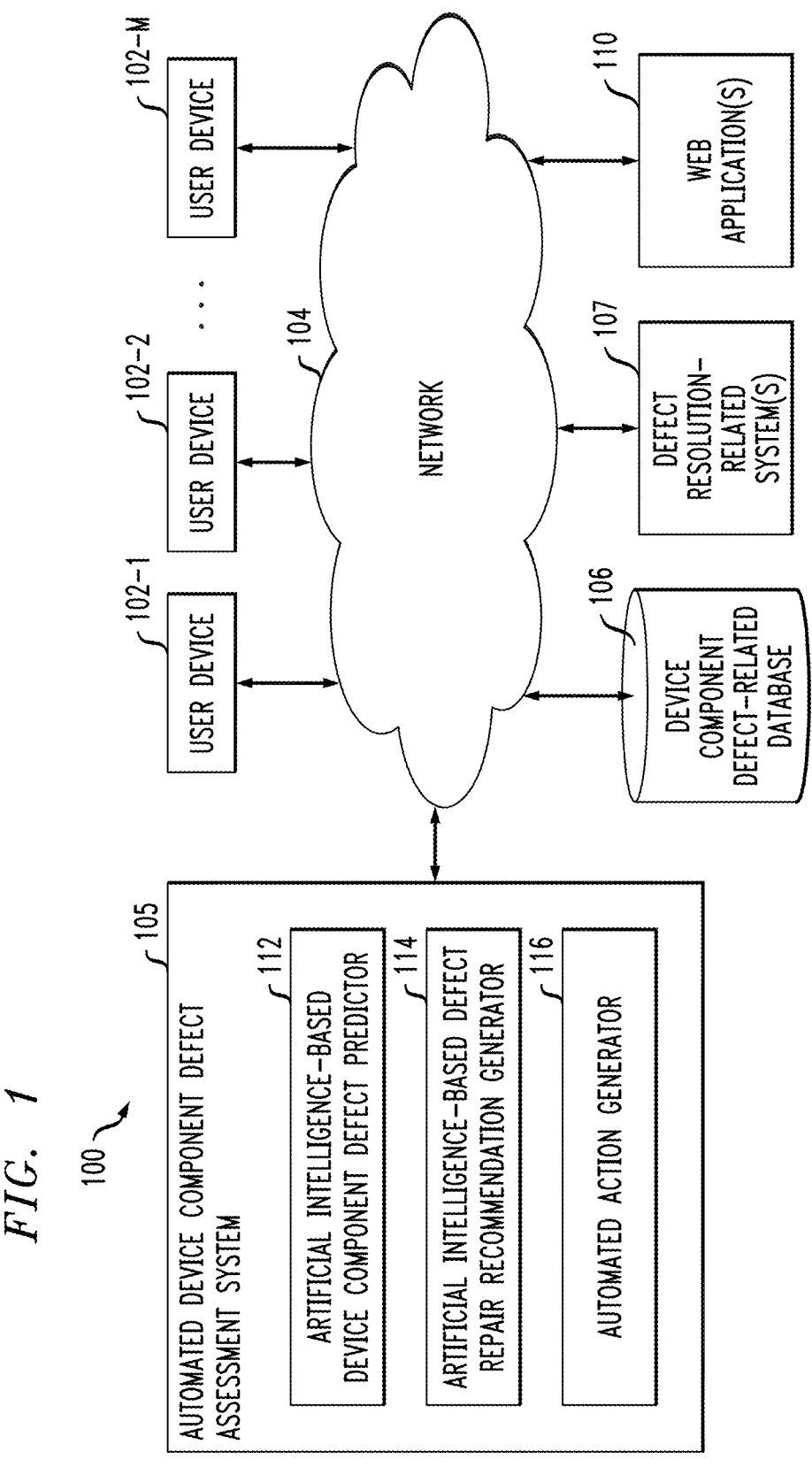
FIG. 1 shows an information processing system configured for detecting device component defects and generating corresponding recommendations using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated device component defect assessment system 105, defect resolution-related system(s) 107 (e.g., an automated system which carries out device component repairs and/or facilitates such repairs), and web application(s) 110 (e.g., a communication application for use by users such as, for example repair technicians, to facilitate device component defect resolution).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated device component defect assessment system 105 can have an associated device component defect-related database 106 configured to store data pertaining to historical instances of a variety of device component defects, which comprise, for example, image data associated with a variety of defects for a variety of device components, log data and/or user interaction data associated with a variety of defects for a variety of device components, resolution-related data associated with a variety of defects for a variety of device components, etc.

The device component defect-related database 106 in the present embodiment is implemented using one or more storage systems associated with the automated device component defect assessment system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated device component defect assessment system 105 are one or more input-output devices, which illustratively comprise keyboards, displays or other types of input-output devices in any combination. Such input-output devices can be used, for example, to support one or more user interfaces to the automated device component defect assessment system 105, as well as to support communication between the automated device component defect assessment system 105 and other related systems and devices not explicitly shown.

Also, the automated device component defect assessment system 105 in the FIG. 1 embodiment is assumed to be implemented using at least one processing device. Each such processing device generally comprises at least one processor and an associated memory, and implements one or more functional modules for controlling certain features of the automated device component defect assessment system 105.

More particularly, the automated device component defect assessment system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated device component defect assessment system 105 to communicate over the network 104 with the user devices 102, and illustratively comprises one or more conventional transceivers.

The automated device component defect assessment system 105 further comprises artificial intelligence-based device component defect predictor 112, artificial intelligence-based defect repair recommendation generator 114, and automated action generator 116.

It is to be appreciated that this particular arrangement of elements 112, 114 and 116 illustrated in the automated device component defect assessment system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for detecting device defects and generating corresponding recommendations using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated device component defect assessment system 105, device component defect-related database 106, defect resolution-related system(s) 107, and web application(s) 110 can be on and/or part of the same processing platform.

An exemplary process utilizing elements 112, 114 and 116 of an example automated device component defect assessment system 105 in computer network 100 will be described in more detail with reference to the flow diagram of FIG. 7.

Accordingly, at least one embodiment includes automatically detecting device defects and generating corresponding recommendations using artificial intelligence techniques. As further detailed herein, such an embodiment can include coupling multimodal large language model (LLM) with image classification and/or object detection techniques.

As such, one or more embodiments include implementing at least one object detection model, in conjunction with one or more deep learning-based image classification techniques, to process image data pertaining to at least a portion of one or more devices (e.g., displays) and/or components (also referred to as parts) thereof, and identify and/or detect one or more defects (e.g., to identify the type of defect(s) using an image classification model and to determine the location of the defect(s) using an object detection model).

Additionally or alternatively, failure symptoms observed during this image processing step can classified using, for example, at least one machine vision model, which can enable accurate classification of component defects that are repairable. Further, at least one embodiment includes processing data associated with the one or more identified and/or detected defects using one or more generative artificial intelligence techniques and/or one or more LLMs to generate at least one report of the defect(s) detected and instructions for performing one or more corrective actions corresponding thereto.

Accordingly, and as further detailed herein, one or more embodiments include generating and passing outputs from at least one image classification deep learning model and at least one object detection model as inputs into at least one LLM to generate one or more repair-related determinations with respect to one or more device component defects, as well as one or more recommendations and/or methods related to repairing at least a portion of the one or more device component defects.

Figure 2:
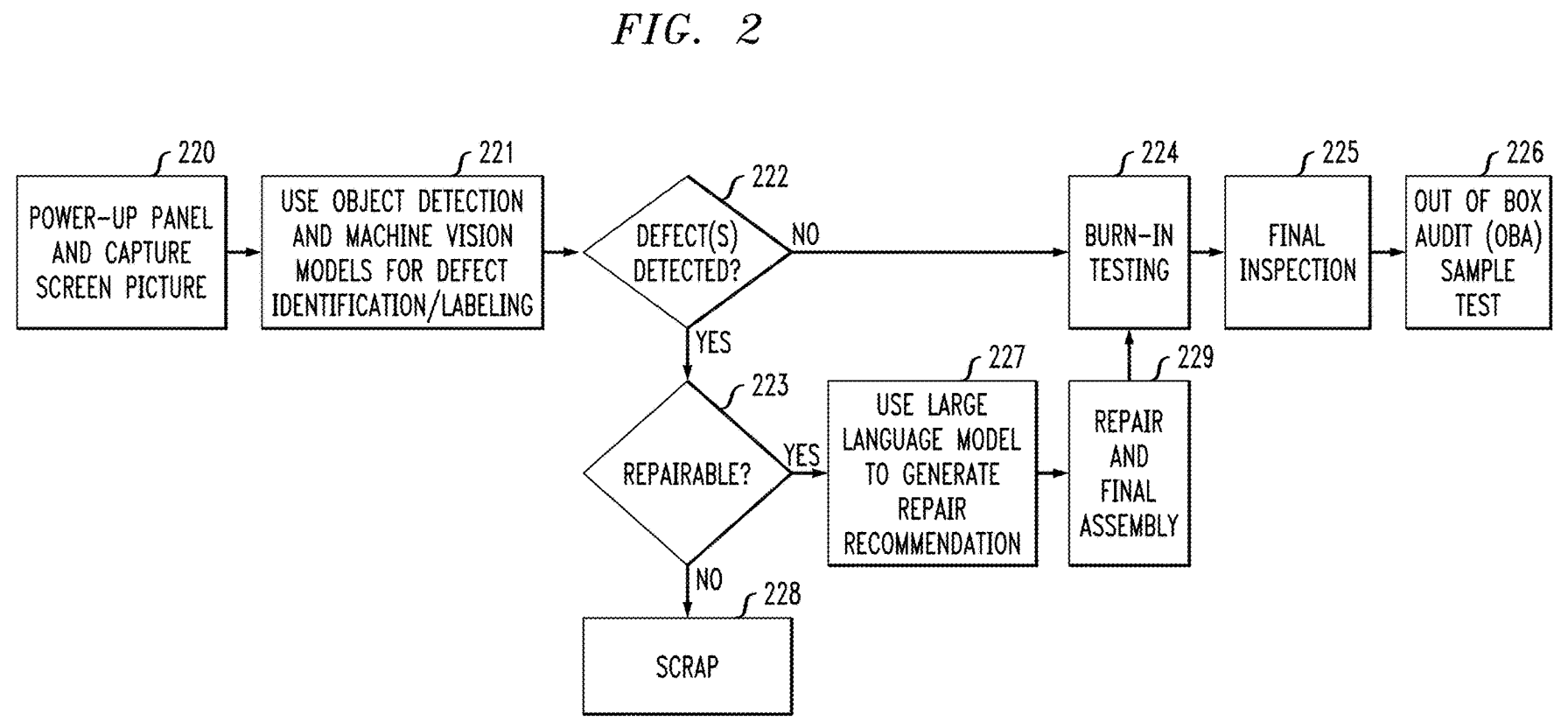

FIG. 2 shows an example workflow with respect to a display panel in an illustrative embodiment. By way of illustration, step 220 includes powering-up and/or powering-on the display panel and capturing at least one image of the display panel using at least one camera (e.g., at least one high-resolution camera). Also, step 221 includes using an object detection model, deep learning-based image classification techniques, and/or a machine vision model (e.g., YOLOv8, YOLOv5, etc.) to process at least a portion of the captured display panel image data to identify and/or label any defective components images.

Step 222 includes determining if any defects are detected. If no defects are detected, burn-in testing is performed in step 224 (wherein burn-in testing refers to a testing process wherein units are tested at approximately 50 degrees Celsius to detect latent failures that might be induced at such temperatures), a final inspection is carried out in step 225, and an out of box audit (OBA) sample test is performed in step 226, wherein an inspector randomly selects samples for user experience testing.

If one or more defects are detected, a determination is made (e.g., using at least one LLM) in step 223 as to whether the one or more defects are repairable. If not (that is, the one or more defects are not repairable), then the display panel is scrapped in step 228. Further, if yes (that is, the one or more defects are repairable), then step 227 includes using generative artificial intelligence techniques and/or at least one LLM to generate a report of identified defects with respect to the display panel and a corrective action(s) summarization. Additionally, repair and final assembly instructions can be generated in step 229 and the workflow proceeds to the burn-in testing step (i.e., step 224). Accordingly, as detailed in connection with step 229, repair and final assembly instructions are generated if the given defect is found to be repairable.

Figure 3:
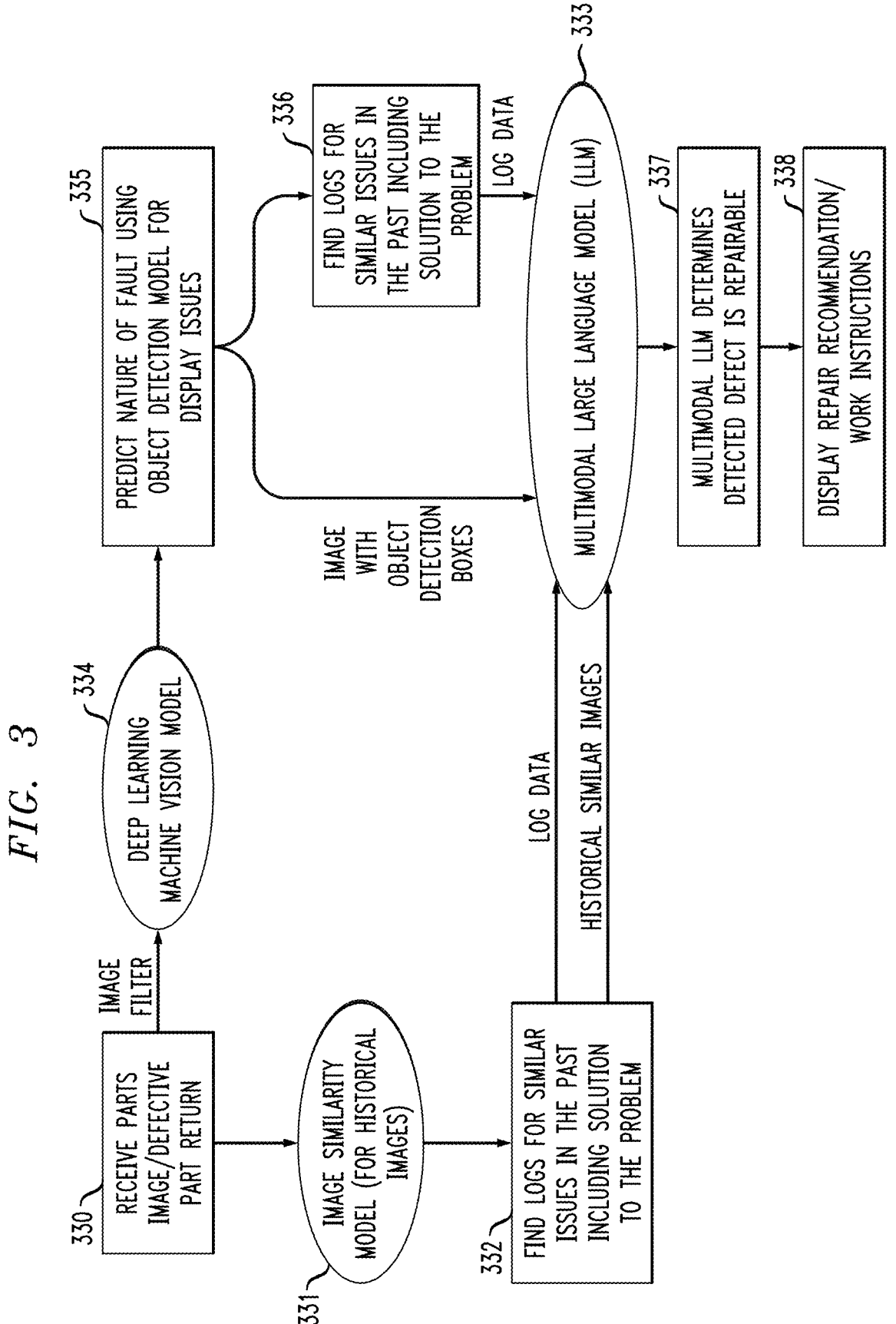
FIG. 3 shows an example workflow with respect to a display panel in an illustrative embodiment.

FIG. 3 shows an example workflow with respect to a display panel in an illustrative embodiment. By way of illustration, step 330 includes receiving device part(s) image data pertaining to at least one device part (e.g., a returned and/or defective part). FIG. 3 also includes processing the image data using at least one image similarity model 331, particularly if the device part(s) in question corresponds to one or more device parts for which there are historical images (e.g., used to train the image similarity model). Based on the detected defect(s) of the device part(s) as determined by the at least one image similarity model 331, step 332 includes finding and/or identifying logs for similar issues in the past, including (if available) solutions for the issues (also referred to herein as defects). The log data and any related similar historical images are then provided to and/or processed by at least one multimodal LLM 333 (e.g., one or more bidirectional encoder representations from transformers (BERT), one or more generative pretrained transformers (GPTs) such as GPT4, etc.).

As also depicted in FIG. 3, the image data pertaining to the at least one device part can be processed, in connection with at least one image filter, using a deep learning-based machine vision model 334. In such an embodiment, the at least one image filter is used for checking if the image is in proper frame of view (FOV), as well as checking lighting parameters and/or one or more other factors which can impact the output of the artificial intelligence techniques (e.g., one or more machine vision models) used in subsequent steps. The at least one image filter can also ensure that image cropping is carried out, which can remove background noise in the image. Based at least in part on such processing by the deep learning-based machine vision model 334, a nature of a fault and/or defect detected (e.g., a crack in the display panel, one or more lines appearing on the display, etc.) can be determined using at least one object detection model (e.g., an object detection model trained on historical display panel issue data) in step 335. Also, step 336 includes finding and/or identifying logs for similar issues in the past, including (if available) solutions for the issues. The log data and the image data with one or more object detection boxes are then provided to and/or processed by the at least one multimodal LLM 333.

Based at least in part on processing the collections of log data, the related similar historical images, and the image data with one or more object detection boxes, the at least one multimodal LLM 333 determines that the detected defect is repairable in step 337, and generates and outputs, in step 338, at least one repair recommendation with instructions associated with performing such a repair.

As detailed herein, one or more embodiments include utilizing and/or maintaining at least one defective device component image database. Such an embodiment can include ensuring sufficient quality and alignment of images capturing defective device components (e.g., display parts) by verifying the proper FOV for such images (e.g., for recalibration purposes). In the case of an improper FOV, at least one embodiment can include prompting for the capture of a new image or requesting a retake of a given image.

Additionally, one or more embodiments include identifying and/or obtaining, from historical cases, user interaction logs and resolution information relating to one or more device component defects. Such an embodiment can include utilizing a pretrained model such as a pretrained convolutional neural network (e.g., VGG16) to transform at least one image of a defective device component (e.g., a defective display part) into at least one vector. This vector is then compared to historical defective device components, in vector format, using one or more similarity measures (e.g., cosine similarity), and images with a similarity measure above a predetermined threshold value are utilized, along with their corresponding repair and/or resolution log information and user interaction information.

At least one embodiment also includes predicting one or more device component defects and locating them on a corresponding image (I) using a combination of image classification techniques and an object detection model. In such an embodiment, the image classification techniques can include, for example, at least one deep learning-based image classification model (e.g., one or more convolutional neural network models) trained to identify the type(s) of defect in an input image (e.g., cracks, lines, pixelation, etc.). Further, such an embodiment can include, subsequent to employing the image classification techniques to identify one or more defects, utilizing at least one object detection model to pinpoint and mark any such identified defect(s) in the image, creating a modified version of the image with one or more bounding boxes around the identified defect(s).

As noted above and herein, one or more embodiments additionally include identifying and/or obtaining historical user interaction logs related to the one or more predicted device component defects. Based at least in part on the device component defects predicted using image classification techniques and at least one object detection model, such an embodiment includes searching historical data and retrieving corresponding and/or relevant historical repair records and/or defect resolution steps, including both text data (e.g., text logs) and image data if available.

Such text data and image data related to defect resolution can then be input to and/or processed by at least one multimodal LLM, which analyzes such input data to confirm whether the device in question and/or components thereof are defective, as well as to provide details about the defect(s) and repair instructions when necessary. Such findings and/or outputs of the multimodal LLM can then be communicated to one or more users (e.g., a given repair technician) and/or output to one or more automated systems for resolution-related action(s).

Accordingly, one or more embodiments can include automating a services parts initial screening of potentially defective device components (e.g., displays) to accurately detect a higher percentage of defects, correctly classify related failure symptoms, and summarize one or more repair and/or resolution recommendations and/or instructions. As detailed herein, such an embodiment can include utilizing an original and/or input device component image, a modified image of the device component with one or more predicted defects highlighted using one or more bounding boxes, and log data pertaining to related historical device component defects and/or failures as an input to at least one LLM, which can output one or more recommended repair and/or resolution actions.

Additionally, in at least one embodiment, confidence scores can be generated in connection with one or more steps within the device component defect prediction and/or identification process (e.g., at the image classification step and/or at the object detection step). Such confidence scores can also be input to and/or processed by the at least one LLM.

By way merely of example, the device component defect prediction and/or identification process can include predicting and/or identifying defects considered and/or classified as unrepairable (e.g., cracked glass, distorted display, fake and/or tampered component, Mura issues, residual image, etc.), and listing such defects by category, occurrence and/or disposition. Additionally or alternatively, such an embodiment can include predicting and/or identifying defects considered and/or classified as repairable (e.g., touch screen damage, scratches on glass, audio issue, hinge damage, cable missing, webcam failure, missing screw, etc.), and listing such defects by category, occurrence and/or disposition. Confidence scores can then be applied to such classifications, and the classifications as well as confidence scores can be input to and/or processed by at least one LLM in furtherance of, for example, improving the quantity of repairable faults detected in order to prevent device component waste.

Figure 4:
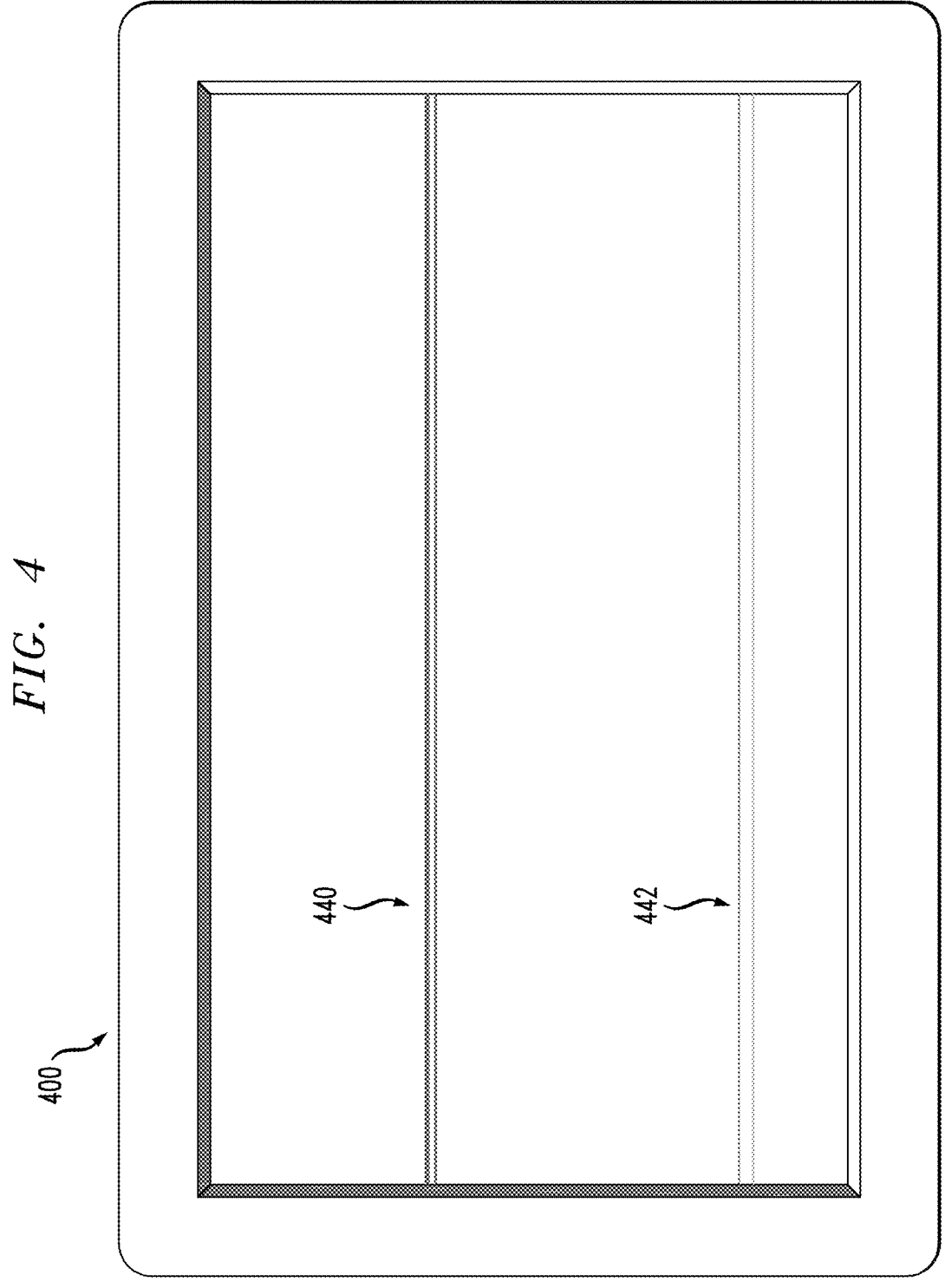
FIG. 4 shows an example image of a defective device component in an illustrative embodiment.

FIG. 4 shows an example image of a defective device component in an illustrative embodiment. More particularly, FIG. 4 depicts an example image 400 of a display with defects 440 and 442. In connection with such an example image 400, one or more embodiments can include capturing and verifying an image. For example, such an embodiment can include taking and/or obtaining an image (I), such as example image 400, of a device component (e.g., a returned display). In conjunction with the image, such an embodiment can include obtaining and/or processing information provided by a user of the device such as, e.g., complaints of a significant and persistent visual distortion issue, including the presence of unusual colors and lines (e.g., defect 440 and defect 442 depicted in FIG. 4) that make it challenging to use the display.

Additionally, such an embodiment can include verifying that the FOV of image (I) is proper and aligned, and if not, requesting another image and/or retaking the image.

Figure 5:
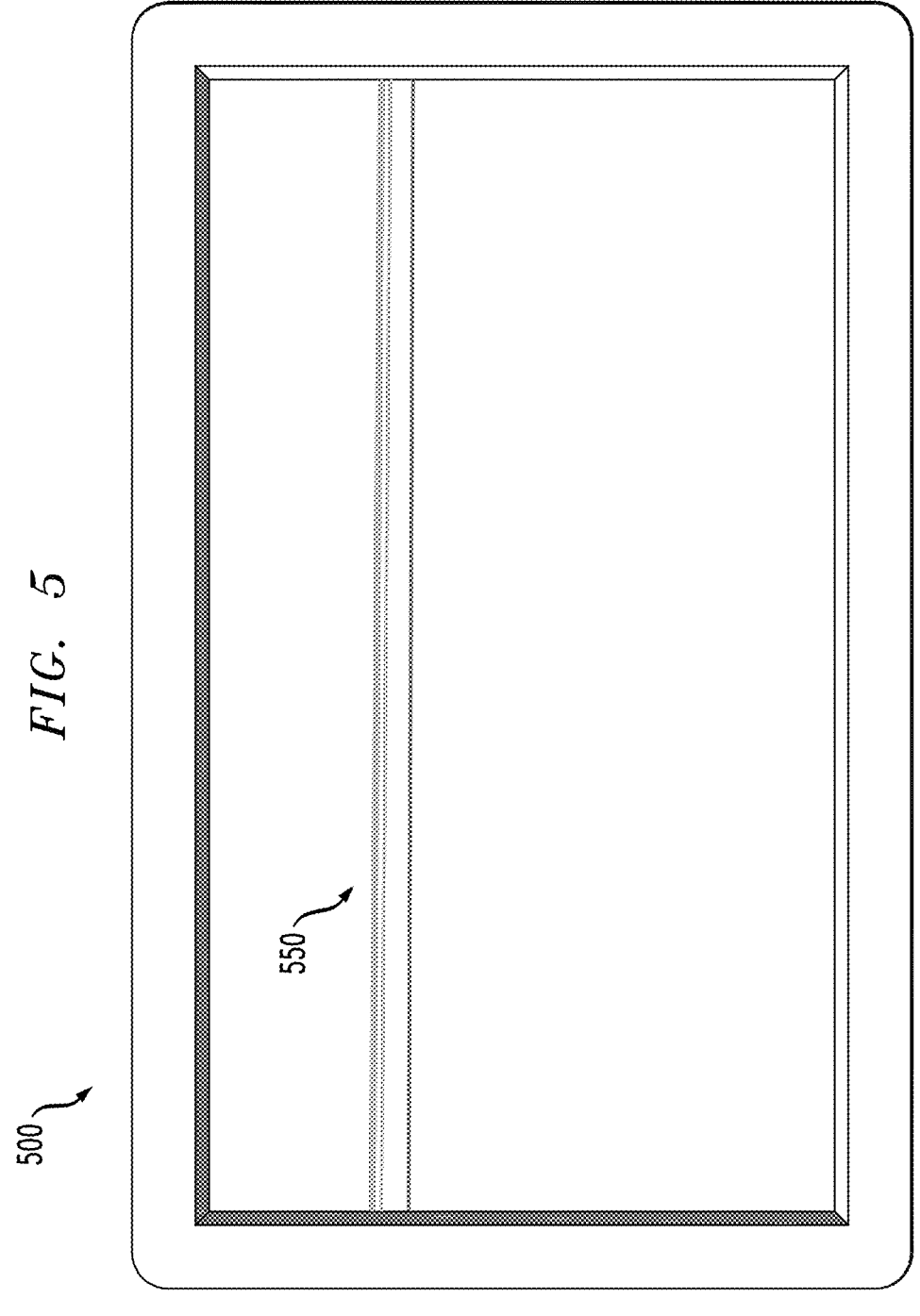
FIG. 5 shows an example image similar to a given defective device component image in an illustrative embodiment.

FIG. 5 shows an example image similar to a given defective device component image in an illustrative embodiment. More particularly, FIG. 5 depicts an image 500 of a display with defect 550, wherein image 500 is similar to example image 400 depicted in FIG. 4. Accordingly, an example embodiment can include using a pretrained model such as a pretrained convolutional neural network (e.g., VGG16) to convert image (I), such as example image 400 from FIG. 4, into a vector and comparing the vector to images (e.g., images converted into corresponding vectors) of historical defective displays using at least one similarity metric (e.g., cosine similarity). At least one similar image, such as image 500 in FIG. 5, can be identified (e.g., based on a similarity measure above a certain threshold) as a result of this comparison, and such a similar image can be denoted as Similar Image $(I_S)$.

Additionally, such an embodiment can further include determining and/or identifying user interaction logs and/or defect resolution logs pertaining to the Similar Image $(I_S)$, and denoting user interaction logs and/or defect resolution logs as Similar Logs $(L_S)$.

By way merely of example, Similar Logs $(L_S)$ corresponding to Similar Image $(I_S)$ 500 might include a user complaint such as the following: "My laptop screen is constantly flickering with horizontal lines appearing across the display, and it has become nearly impossible to use the laptop due to this persistent visual disturbance." Further, resolution details for Similar Image $(I_S)$ 500, determined based at least in part on processing Similar Image $(I_S)$ 500 and the corresponding Similar Logs $(L_S)$, might include the following: "Inspected and reseated connections first with no effect, then checked for overheating issues before reinstalling graphics drivers, which helped in eliminating the flickering problem."

Figure 6:
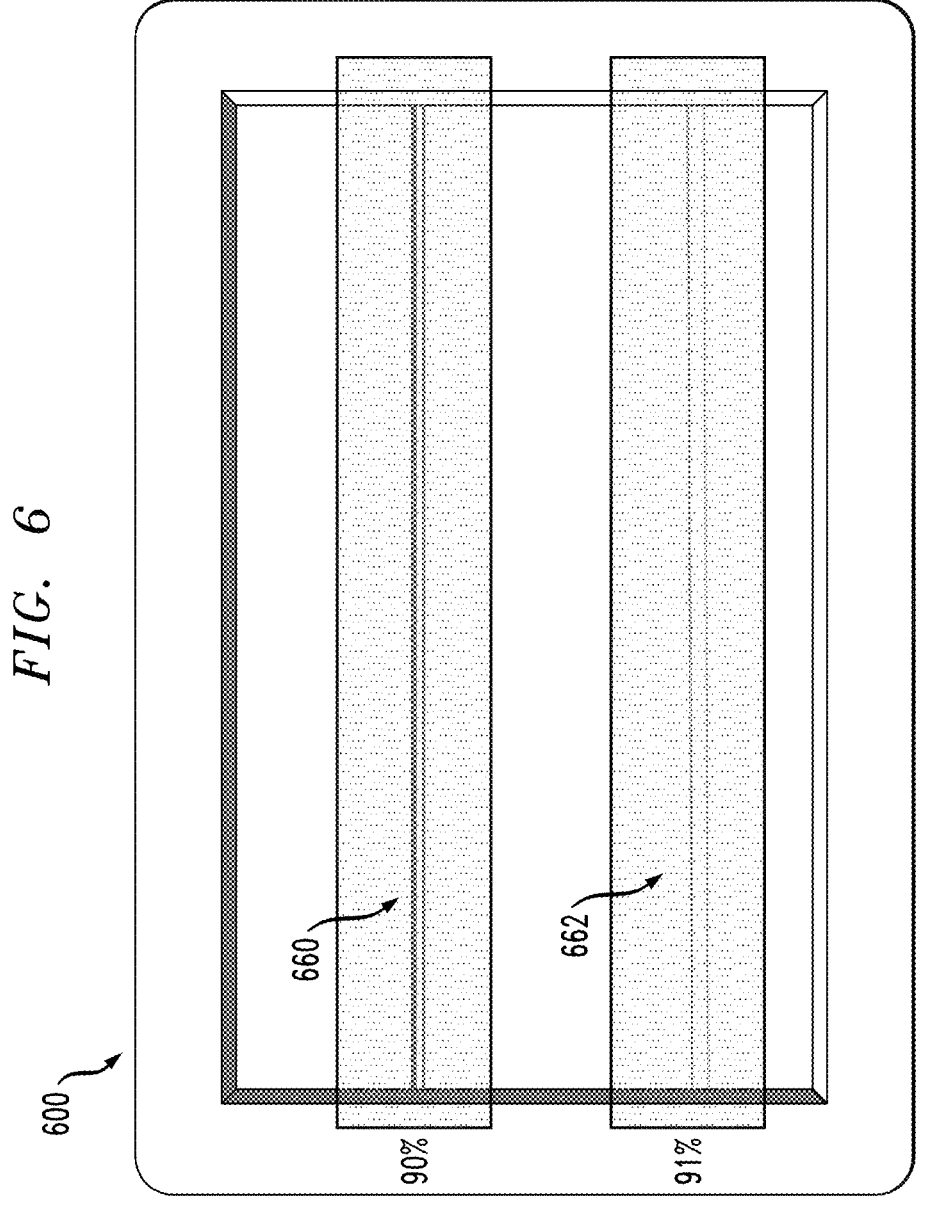
FIG. 6 shows object detection confidence levels in connection with a given device component image in an illustrative embodiment.

FIG. 6 shows object detection confidence levels in connection with a given device component image in an illustrative embodiment. More particularly, FIG. 6 depicts an example image 600 of a display with predicted defects 660 and 662 highlighted with corresponding confidence values of 90% and 91%, respectively. Accordingly, an example embodiment can include using predicted defects 660 and 662 on image (I) 600 using a combination of image classification techniques and at least one object detection model. For image (I) 600, the predicted defects, categorized using at least one deep learning-based image classification model, include dead pixels and/or horizontal lines issues (represented by 660 and 662 in FIG. 6). Using an object detection model, such an example embodiment can include locating such defects on image (I) 600 using bounding boxes generated by the object detection model. Confidence levels associated with each such bounding box can then be calculated.

As detailed herein, at least one embodiment also includes determining and/or finding historical device user interaction information related to the predicted and/or identified device component defect(s). Such device user interaction information can include, for example, historical repair logs and/or resolution steps associated with similar device component defects, as well as images related thereto.

By way of example, device user interaction information related to a dead pixel and/or horizontal line issue similar to that depicted in FIG. 6 can include a historical user interaction log including the following user complaint: "The problem with my laptop screen is that I am seeing horizontal lines that will not go away. The horizontal lines are not solid lines but appear more as thin, irregular rows of various colors. It is distracting and I am not sure what is causing this issue. I have tried restarting the laptop, but the lines remain."

Continuing with such an example, historical repair logs and/or resolution steps associated with a dead pixel and/or horizontal line issue similar to that depicted in FIG. 6 can include a historical resolution summarization as follows: "The description suggests that the resistance temperature detector (RTD) in the liquid crystal display (LCD) has dead pixels which may be caused by software issues or manufacturing defects. To fix the issue, I ran an LCD built-in self-test (BIST) test and checked for any software updates or patches that may help resolve the problem, and it appears that a display drivers update fixed the issue."

As also detailed herein, such historical user interaction log information and historical resolution summarization, along with any images related thereto, can be fed to and/or processed by at least one multimodal LLM. In such an example embodiment, a prompt to the LLM can be generated which instructs the LLM to determine and/or check, based on the historical log data and related image data, whether the current display is truly defective (e.g., whether the display in question contains defects sufficiently similar to the historical examples identified by the image classification techniques and/or object detection model). If yes (i.e., the current display is deemed defective), the multimodal LLM can respond with and/or generate an output identifying the nature of the defect(s) and instructions on how the defect(s) can be fixed.

By way of illustration, below is an example prompt that can be generated and provided as input to a multimodal LLM: "You are a repair technician who fixes LCD issues in a repair depot and one of your objectives is to find a solution such that LCDs are not scrapped if it is possible to repair them. Consider Image (I), which is of a defective screen which was brought in for repair today by a user complaining of a significant and persistent visual distortion issue. The user describes the problem as unusual colors and lines that make it difficult to use the monitor."

The prompt can also include the following: "Similar Image ($I_S$) is the most similar historical image to Image (I), and the user complaint for Similar Image ($I_S$) included a statement that 'My laptop screen is constantly flickering with horizontal lines appearing across the display, and it has become difficult to use the laptop due to this persistent visual disturbance.' The resolution provided in the past for this Similar Image ($I_S$) includes a report that states 'Inspected and reseated connections first with no effect; Checked for overheating issues also; Reinstalled graphics drivers, which helped in eliminating the flickering problem.'"

The prompt can additionally include the following: "A deep learning model trained on common LCD issues predicted that the issue for Image (I) was a dead pixel/horizontal lines issue. An object detection model identified the dead pixel/horizontal lines issues on two places in Image (I) with confidence levels of 90% and 91%, respectfully."

Further, the prompt can include the following: "A user interaction log form associated with Similar Image ($I_S$) contained the following statements: 'The problem with my laptop screen is that I am seeing unusual horizontal lines that will not go away. They are not solid lines but look more like thin, irregular rows of various colors. It is really distracting, and I am not sure what is causing it. I have tried restarting the laptop, but the lines are still there.' The resolution provided for this Similar Image ($I_S$) contained the following statements: 'The description suggests that the RTD-LCD has dead pixels and may be caused by software issues or manufacturing defects. To fix the issue, I ran an LCD BIST and checked for any software updates or patches that may help resolve the problem. A display drivers update fixed the issue.'"

Finally, the LLM prompt can also include the following: "Please identify the issue with Image (I) as well as the resolution for the identified issue based on the following items: Image (I); the issue described by the user; Similar Image ($I_S$); issue(s) and resolution(s) provided in connection with Similar Image ($I_S$); object detection model findings on Image (I); deep learning model prediction of issue on Image (I); and historical user interaction logs and resolution information associated with Similar Image ($I_S$)."

In one or more embodiments, such a prompt is compiled by an expert human user based on the setup depicted in FIG. 3. The prompt can include information about the various inputs provided to the multimodal LLM, and once the prompt starts working (e.g., as decided by regression testing, etc.), then substantial changes to the prompt will not be needed.

Considering this illustrative example, a given multimodal LLM can process the above prompt and generate an output that includes the following: "Based on the information provided, here is an analysis of the issue with Image (I) and the possible resolution: The user describes the problem as 'unusual colors and lines' that make it difficult to use the monitor. This issue is similar to the problem described in the historical image Similar Image ($I_S$) as 'unusual horizontal lines that will not go away.' For Similar Image ($I_S$), the issue was diagnosed as the RTD-LCD having dead pixels and was initially described as 'unusual horizontal lines that will not go away.' The resolution provided for this issue was updating display drivers, which fixed the problem. The object detection model identified dead pixel issues on Image (I) with confidence levels of 90% and 91%. The deep learning model predicted that the issue with Image (I) is a dead pixels/horizontal lines issue. Based on the information provided, it is likely that the issue with Image (I) is a dead pixels/horizontal lines issue, similar to Similar Image ($I_S$). The historical resolution for Similar Image ($I_S$) involved updating display drivers, which fixed the problem. Therefore, the recommended resolution for the device component represented in Image (I) would be to follow a similar process as carried out in connection with resolving the issue associated with Similar Image ($I_S$). That process includes the following steps: (1) run an LCD BIST to confirm the presence of dead pixels; (2) check for any software updates or patches that may help resolve the issue; and (3) if the issue is indeed related to dead pixels, update one or more display drivers or apply relevant software updates or patches."

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on input device component image data, input descriptive data associated with the input device component image data, historical device component image data, and/or historical descriptive data associated with the historical device component image data, and such recommendations and/or predictions can be used to initiate one or more automated actions (e.g., automatically identifying and/or predicting one or more defects associated with the input device component image data, automatically generating and outputting resolution instructions associated with the one or more defects, etc.).

FIG. 7 is a flow diagram of a process for detecting device defects and generating corresponding recommendations using artificial intelligence techniques in an illustrative embodiment. It is to be understood that this particular process is only an example, and additional or alternative processes can be carried out in other embodiments.

In this embodiment, the process includes steps 700 through 708. These steps are assumed to be performed by the automated device component defect assessment system 105 utilizing elements 112, 114 and 116.

Step 700 includes obtaining image data of one or more device components and user input pertaining to at least a portion of the one or more device components. In at least one embodiment, obtaining user input pertaining to at least a portion of the one or more device components includes obtaining at least one user-provided description of at least one issue associated with the one or more device components.

Step 702 includes predicting at least one defect associated with the one or more device components by processing at least a portion of the image data and at least a portion of the user input using a first set of one or more artificial intelligence techniques. In one or more embodiments, predicting at least one defect associated with the one or more device components includes processing at least a portion of the image data and at least a portion of the user input using one or more deep learning-based image classification techniques. In such an embodiment, processing at least a portion of the image data and at least a portion of the user input using one or more deep learning-based image classification techniques can include processing the at least a portion of the image data and at least a portion of the user input using at least one pretrained convolutional neural network relevant to at least a portion of the one or more device components. Additionally or alternatively, processing at least a portion of the image data and at least a portion of the user input using one or more deep learning-based image classification techniques can include identifying one or more items of historical image data comprising at least a predetermined level of similarity to one or more portions of the obtained image data. Further, in such an embodiment, predicting at least one defect associated with the one or more device components can also include determining and obtaining one or more items of historical user input corresponding to at least a portion of the one or more items of identified historical image data.

Additionally or alternatively, predicting at least one defect associated with the one or more device components can include processing at least a portion of the image data and at least a portion of the user input using at least one object detection model. In such an embodiment, processing at least a portion of the image data and at least a portion of the user input using at least one object detection model can include generating a modified version of the at least a portion of the image data comprising at least one bounding box represented in connection with the at least one predicted defect.

Step 704 includes determining, using a second set of one or more artificial intelligence techniques, that the at least one predicted defect is repairable. Step 706 includes generating one or more recommendations for repairing the at least one predicted defect by processing, using the second set of one or more artificial intelligence techniques, the at least a portion of the image data, the at least a portion of the user input, and information pertaining to the at least one predicted defect. In at least one embodiment, generating one or more recommendations for repairing the at least one predicted defect using a second set of one or more artificial intelligence techniques includes processing the at least a portion of the image data, the at least a portion of the user input, and information pertaining to the at least one predicted defect using at least one multimodal LLM. Also, in such an embodiment, generating one or more recommendations for repairing the at least one predicted defect can include generating a sequentially ordered set of instructions for repairing the at least one predicted defect.

Step 708 includes performing one or more automated actions based at least in part on the one or more generated recommendations. In one or more embodiments, performing one or more automated actions includes outputting the one or more generated recommendations to one or more of at least one user and at least one automated system associated with the one or more device components. Additionally or alternatively, performing one or more automated actions can include automatically training, using feedback related to the one or more generated recommendations, at least a portion of the first set of one or more artificial intelligence techniques and/or at least a portion of the second set of one or more artificial intelligence techniques.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically detect device defects and generate corresponding recommendations using artificial intelligence techniques. These and other embodiments can effectively overcome problems associated with resource wastage arising from error-prone approaches. For example, one or more embodiments can include converting device components that would be rejected or deemed unrepairable by conventional approaches into repairable device components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more information processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a CPU, a GPU, a TPU, a microcontroller, an ASIC, a FPGA or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining image data of one or more device components and user input pertaining to at least a portion of the one or more device components;

predicting at least one defect associated with the one or more device components by processing at least a portion of the image data and at least a portion of the user input using a first set of one or more artificial intelligence techniques;

determining, using a second set of one or more artificial intelligence techniques, that the at least one predicted defect is repairable;

generating one or more recommendations for repairing the at least one predicted defect by processing, using the second set of one or more artificial intelligence techniques, the at least a portion of the image data, the at least a portion of the user input, and information pertaining to the at least one predicted defect; and performing one or more automated actions based at least in part on the one or more generated recommendations, wherein performing the one or more automated actions comprises one or more of (i) automatically training at least a portion of the first set of one or more artificial intelligence techniques using feedback related to the one or more generated recommendations, and (ii) automatically training at least a portion of the second set of one or more artificial intelligence techniques using the feedback related to the one or more generated recommendations;

wherein the method is performed by at least one processing device comprising a processor coupled to a memory.

2. The computer-implemented method of claim 1, wherein predicting the at least one defect associated with the one or more device components comprises processing the at least a portion of the image data and the at least a portion of the user input using one or more deep learning-based image classification techniques.

3. The computer-implemented method of claim 2, wherein processing the at least a portion of the image data and the at least a portion of the user input using one or more deep learning-based image classification techniques comprises processing the at least a portion of the image data and the at least a portion of the user input using at least one pretrained convolutional neural network relevant to the at least a portion of the one or more device components.

4. The computer-implemented method of claim 2, wherein processing the at least a portion of the image data and the at least a portion of the user input using one or more deep learning-based image classification techniques comprises identifying one or more items of historical image data comprising at least a predetermined level of similarity to one or more portions of the obtained image data.

5. The computer-implemented method of claim 4, wherein predicting the at least one defect associated with the one or more device components comprises determining and obtaining one or more items of historical user input corresponding to at least a portion of the one or more items of identified historical image data.

6. The computer-implemented method of claim 1, wherein predicting the at least one defect associated with the one or more device components comprises processing the at least a portion of the image data and the at least a portion of the user input using at least one object detection model.

7. The computer-implemented method of claim 6, wherein processing the at least a portion of the image data and the at least a portion of the user input using at least one object detection model comprises generating a modified version of the at least a portion of the image data comprising at least one bounding box represented in connection with the at least one predicted defect.

8. The computer-implemented method of claim 1, wherein generating the one or more recommendations for repairing the at least one predicted defect using the second set of one or more artificial intelligence techniques comprises processing the at least a portion of the image data, the at least a portion of the user input, and the information pertaining to the at least one predicted defect using at least one multimodal large language model (LLM).

9. The computer-implemented method of claim 1, wherein generating the one or more recommendations for repairing the at least one predicted defect comprises generating a sequentially ordered set of instructions for repairing the at least one predicted defect.

10. The computer-implemented method of claim 1, wherein performing the one or more automated actions comprises outputting the one or more generated recommendations to one or more of at least one user and at least one automated system associated with the one or more device components.

11. The computer-implemented method of claim 1, wherein obtaining the user input pertaining to at least a portion of the one or more device components comprises obtaining at least one user-provided description of at least one issue associated with the one or more device components.

12. A non-transitory processor-readable storage medium having stored therein program code of one or more software programs, wherein the program code when executed by at least one processing device causes the at least one processing device:

to obtain image data of one or more device components and user input pertaining to at least a portion of the one or more device components;

to predict at least one defect associated with the one or more device components by processing at least a portion of the image data and at least a portion of the user input using a first set of one or more artificial intelligence techniques;

to determine, using a second set of one or more artificial intelligence techniques, that the at least one predicted defect is repairable;

to generate one or more recommendations for repairing the at least one predicted defect by processing, using the second set of one or more artificial intelligence techniques, the at least a portion of the image data, the at least a portion of the user input, and information pertaining to the at least one predicted defect; and to perform one or more automated actions based at least in part on the one or more generated recommendations, wherein performing the one or more automated actions comprises one or more of (i) automatically training at least a portion of the first set of one or more artificial intelligence techniques using feedback related to the one or more generated recommendations, and (ii) automatically training at least a portion of the second set of one or more artificial intelligence techniques using the feedback related to the one or more generated recommendations.

13. The non-transitory processor-readable storage medium of claim 12, wherein predicting the at least one defect associated with the one or more device components comprises processing the at least a portion of the image data and the at least a portion of the user input using one or more deep learning-based image classification techniques.

14. The non-transitory processor-readable storage medium of claim 12, wherein predicting the at least one defect associated with the one or more device components comprises processing the at least a portion of the image data and the at least a portion of the user input using at least one object detection model.

15. The non-transitory processor-readable storage medium of claim 12, wherein generating the one or more recommendations for repairing the at least one predicted defect using the second set of one or more artificial intelligence techniques comprises processing the at least a portion of the image data, the at least a portion of the user input, and the information pertaining to the at least one predicted defect using at least one multimodal LLM.

16. An apparatus comprising:

at least one processing device comprising a processor coupled to a memory;

the at least one processing device being configured:

to obtain image data of one or more device components and user input pertaining to at least a portion of the one or more device components;

to predict at least one defect associated with the one or more device components by processing at least a portion of the image data and at least a portion of the user input using a first set of one or more artificial intelligence techniques;

to determine, using a second set of one or more artificial intelligence techniques, that the at least one predicted defect is repairable;

to generate one or more recommendations for repairing the at least one predicted defect by processing, using the second set of one or more artificial intelligence techniques, the at least a portion of the image data, the at least a portion of the user input, and information pertaining to the at least one predicted defect; and to perform one or more automated actions based at least in part on the one or more generated recommendations, wherein performing the one or more automated actions comprises one or more of (i) automatically training at least a portion of the first set of one or more artificial intelligence techniques using feedback related to the one or more generated recommendations, and (ii) automatically training at least a portion of the second set of one or more artificial intelligence techniques using the feedback related to the one or more generated recommendations.

17. The apparatus of claim 16, wherein predicting the at least one defect associated with the one or more device components comprises processing the at least a portion of the image data and the at least a portion of the user input using at least one of one or more deep learning-based image classification techniques and at least one object detection model.

18. The apparatus of claim 16, wherein generating the one or more recommendations for repairing the at least one predicted defect using the second set of one or more artificial intelligence techniques comprises processing the at least a portion of the image data, the at least a portion of the user input, and the information pertaining to the at least one predicted defect using at least one multimodal LLM.

19. The apparatus of claim 16, wherein generating the one or more recommendations for repairing the at least one predicted defect comprises generating a sequentially ordered set of instructions for repairing the at least one predicted defect.

20. The apparatus of claim 16, wherein performing the one or more automated actions comprises outputting the one or more generated recommendations to one or more of at least one user and at least one automated system associated with the one or more device components.

* * * * *